United States Patent
Golobay (10) Patent No.: US 8,973,112 B2
(45) Date of Patent: Mar. 3, 2015

(54) SYSTEM AND METHOD FOR PROVIDING A NORMALIZED SECURITY LIST

(75) Inventor: Paul Michael Golobay, Farmers Branch, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1363 days.

(21) Appl. No.: 12/351,683

(22) Filed: Jan. 9, 2009

(65) Prior Publication Data

US 2010/0180325 A1    Jul. 15, 2010

(51) Int. Cl.
G06F 7/04 (2006.01)
G06F 15/16 (2006.01)
G06F 17/30 (2006.01)
H04L 29/06 (2006.01)

(52) U.S. Cl.
CPC .............. *H04L 63/20* (2013.01); *H04L 63/101* (2013.01)
USPC .................................................. 726/6; 726/1

(58) Field of Classification Search
None
See application file for complete search history.

(56) References Cited

U.S. PATENT DOCUMENTS

| | | | |
|---|---|---|---|
| 6,961,809 B2 * | 11/2005 | Krishnan et al. ............ 711/108 |
| 7,188,164 B1 * | 3/2007 | Etheridge ..................... 709/221 |
| 7,925,666 B1 * | 4/2011 | Johnson et al. .............. 707/781 |
| 2003/0014557 A1 * | 1/2003 | Berger et al. ................. 709/318 |
| 2004/0064727 A1 * | 4/2004 | Yadav ........................... 713/201 |
| 2005/0267928 A1 * | 12/2005 | Anderson et al. ............ 709/200 |
| 2006/0059481 A1 * | 3/2006 | Smith et al. .................. 717/173 |
| 2008/0098453 A1 * | 4/2008 | Hinton et al. ..................... 726/1 |
| 2009/0119750 A1 * | 5/2009 | Sembugamoorthy et al. .... 726/3 |

* cited by examiner

*Primary Examiner* — Nadia Khoshnoodi (57) ABSTRACT

A system and method for providing a normalized security list including a first module configured to generate a first normalized security list of user identifications within a network and a second module configured to generate a second normalized security list of user identifications within the network. The system and method may also include an equalizer module configured to compare the first normalized security list with the second normalized security list, equalize the first normalized security list based on the second normalized security list, and equalize the second normalized security list based on the first security list. The system and method may also include a processing module configured to perform an audit of user identifications within the network by processing the first equalized normalized security list and the second equalized normalized security list and generating audit results based on the processing.

17 Claims, 4 Drawing Sheets

| # | NE ID | User ID | Status | NE Priv | RMS Priv | Last Login |
|---|---|---|---|---|---|---|
| #1 | NE-12345678 | UserA | OK | Secure | Secure | 20 hrs, 12 mins ago |
| #2 | NE-12345678 | UserB | OK | Secure | Secure | 3 days ago |
| #3 | NE-12345678 | UserC | ELE? | ? | Admin | Never |
| #4 | NE-12345678 | UserD | ELE? | ? | Admin | Never |
| #5 | NE-12345678 | UserE | PRV? | Secur | Admin | 84 days ago |
| #6 | NE-12345678 | UserF | PRV? | Secur | Admin | 118 days ago |
| #7 | NE-12345678 | UserG | RMS? | Admin | ? | 49 days ago |
| #8 | NE-12345678 | UserH | RMS? | Admin | ? | 26 days ago |

SYSTEM AND METHOD FOR PROVIDING A NORMALIZED SECURITY LIST

BACKGROUND INFORMATION

Because of recent advances in communications and information technology, network security has become an important issue. A large part of network security involves user authentication and access control. Auditing may be a useful way to identify one or more access credentials for users at one or more network elements within a network. However, as the number and variations of access credentials and/or network elements within a network increases, a manual audit process may become increasingly cumbersome and ineffective and network security may therefore be compromised. Conventional systems lack a technique for providing a normalized security list for efficient and comprehensive auditing within existing technologies.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Reference will now be made in detail to exemplary embodiments, examples of which are illustrated in the accompanying drawings. Wherever possible, the same reference numbers will be used throughout the drawings to refer to the same or like parts. It should be appreciated that the following detailed description are exemplary and explanatory only and are not restrictive.

The exemplary systems and methods are discussed in terms of providing a "normalized security list (NSL)" It should be appreciated that as used herein, a "security list" may refer to any list identifying users (e.g., via user identification or userIDs) within a network. A "normalized security list (NSL)" may be a security list that is standardized using one or more particular formats.

For example, it should be appreciated that the "user identification" and/or "UserID" may be stored in one or more security lists. For instance, each UserID may include a sublist of one or more network elements upon which it may exist. For each network element, a "privclass" of the UserID on that particular network element may also be provided. The "privclass" may represent a level of privilege/access (e.g., administrator privilege, etc.). In addition, a time factor (e.g., number of days) may be provided for each network element, indicating a time since last login by the user associated with the UserID. In some embodiments, for example, providing and/or storing a list of UserIDs may include the following format:

```
User ID
    Element A PrivX Days
    Element B PrivX Days
    Element C PrivY Days
    Element D PrivZ Days
    ...
```

Accordingly, a normalized security list may be used to store information associated with one or more UserIDs, one or more network elements, one or more privclasses, and/or time since last login. In some embodiments, a normalized security list (NSL) may be provided, stored, and/or sorted in alphabetical order by UserID. It should be appreciated that in this example, element IDs (e.g., Element A, etc.) may also be provided, stored, and/or sorted in alphabetical order for each UserID. In other embodiments, a normalized security list (NSL) may be provided by a central system (e.g., Request Management System (RMS)) and/or by a network element (NE). Since information provided by the Request Management System (RMS) and/or network element (NE) may not always be in the same format, applying the format described above may be useful for standardizing normalized security lists (NSLs) provided by the Request Management System (RMS) and/or network element (NE).

It should be appreciated that "NULL" may be used to indicate unspecified or unidentifiable field. For example, an element list with a first member having a name of NULL may indicate that the network element (NE) locations may not be specified and that the UserID may be assumed to exist on all elements. A privclass designated as NULL may indicate that either the privclass is not known or that privclass is invalid for that particular device type.

Thus, exemplary embodiments may provide a system and method for providing a normalized security list. That is, exemplary embodiments may, among other things, improve network security by providing a normalized security in a manner that is efficient and comprehensive for operation within the framework of existing auditing technologies and/or processing.

Figure 1:
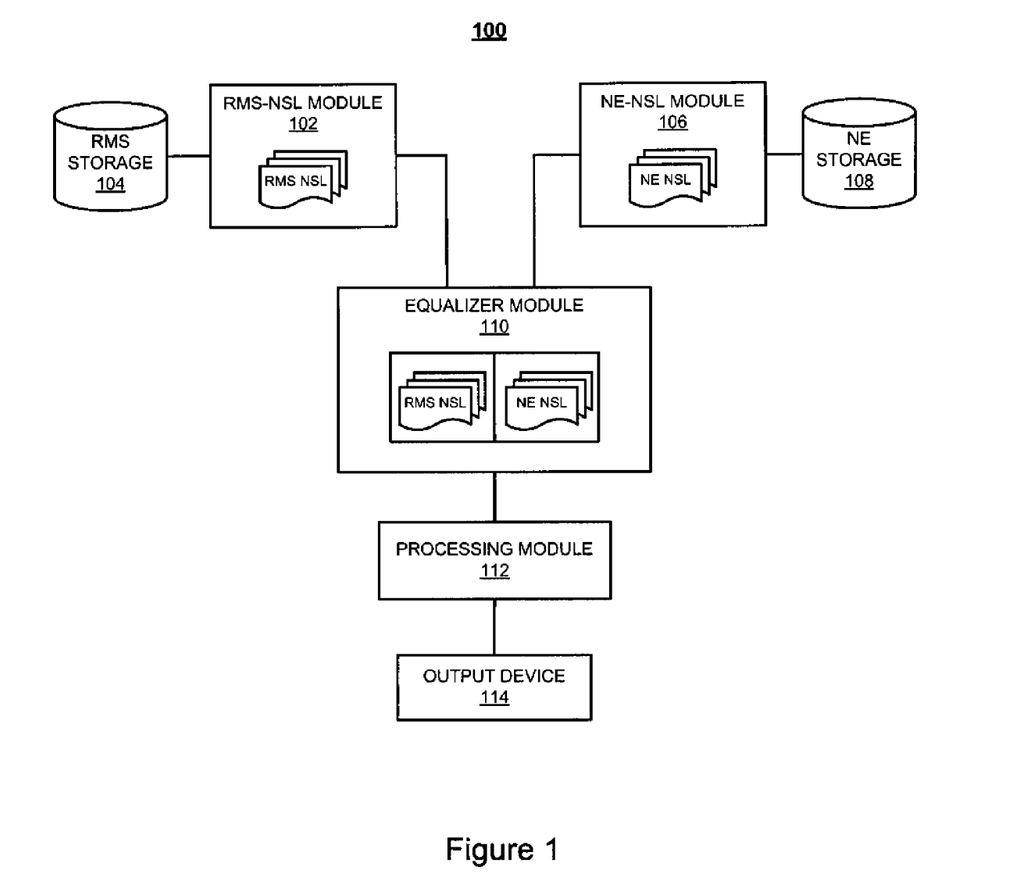
FIG. 1 depicts a block diagram of a system architecture for providing a normalized security list, according to an exemplary embodiment.

FIG. 1 depicts a block diagram of a system architecture for providing a normalized security list, according to an exemplary embodiment. The system 100 may include a request management system (RMS) module 102 communicatively coupled to a request management system (RMS) storage 104 and a network element (NE) module 106 communicatively coupled to a network element (NE) storage 108. The request management system (RMS) module 102 and the network element (NE) module 106 may each be communicatively coupled to an equalizer module 110. The equalizer module 110 may be communicatively coupled to a processing module 112, which in turn may be communicatively coupled to an output device 114. It should be appreciated that in some embodiments, the components of the system 100 may be integrated. For example, in some embodiments, the request management system (RMS) module 102 may be integrated with the request management system (RMS) storage 104 and the network element (NE) module 106 may be integrated with the network element (NE) storage 108. In other embodiments, the equalizer module 110 may be integrated with the processing module 112.

It should be appreciated that each of the components of system 100 (e.g., servers, modules, storage, devices, systems, etc.) may communicate with each other via a network. The network may include the Internet, the World Wide Web, or other similar network for communicatively coupling servers, modules, devices, and/or network systems. The network may provide communication ability between the various the components of system 100 via electric, electromagnetic, and/or optical signals that carry digital data streams. For example, the network may be a wireless network, a wired network or any combination of wireless network and wired network. For example, the network may include, without limitation, Internet network, satellite network (e.g., operating in Band C, Band Ku and/or Band Ka), wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or any other wireless network for transmitting a signal. In addition, the network may include, without limitation, telephone line, fiber optics, EEE Ethernet 802.3, wide area network (WAN), local area network (LAN), global network such as the Internet. Also, the internal data network 106 may enable, an Internet network, a wireless communication network, a cellular network, an Intranet, or the like, or any combination thereof. The network may further include one, or any number of the exemplary types of networks mentioned above operating as a stand-alone network or in cooperation with each other.

The request management system (RMS) module 102 may be a centralized system including one or more processors (not shown) where one or more requests from users (e.g., employees/contractors) may receive access to a network/platform in which the centralize system is situated. Accordingly, the request management system (RMS) module 104 may store and/or provide information (e.g., UserIDs) associated with those users having access to the network/platform. Thus, the request management system (RMS) module 102 may provide a request management system normalized security list (RMS-NSL) and/or other related information.

The request management system (RMS) module 102 may include a SQL Server, UNIX based servers, Windows 2000 Server, Microsoft IIS server, Apache HTTP server, API server, Java sever, Java Servlet API server, ASP server, PHP server, HTTP server, Mac OS X server, Oracle server, IP server, and/or other independent server to provide one or more request management system normalized security lists (RMS-NSLs). Also, the request management system (RMS) module 102 may store and/or run a variety of software, for example, Microsoft .NET framework, etc.

The data and/or information provided by the request management system (RMS) module 102 may be stored and/or indexed in one or more databases (e.g., the request management system (RMS) storage 104). In this example, the request management system (RMS) storage 104 may store data and/or information (e.g., UserIDs) associated with those users having access to the network/platform. The request management system (RMS) module 102 may be in communication with the equalizer module 110. Here, the request management system (RMS) module 102 may utilize processor logic to provide the data and/or information, for example, in a normalized security list (e.g., a request management system normalized security list (RMS-NSL)) and deliver it to the equalizer module 110 for processing. In addition to providing a request management system normalized security list (RMS-NSL), the request management system (RMS) module 102 may also provide, record, store, and/or index other security-related data and/or information.

Although the request management system (RMS) module 102 is depicted as one module, it should be appreciated that the contents of the request management system (RMS) module 104 may be combined into fewer or greater numbers of modules, servers (or server-like devices), devices, and components and may be connected to one or more data storage systems, in addition to the request management system (RMS) storage 104. Furthermore, the request management system (RMS) module 102 may be local, remote, or a combination thereof to the equalizer module 110, processing module 112, and/or output device 114. The request management system (RMS) module 102 may also store additional data and/or information relevant for personalized security functionalities.

As described above, the request management system (RMS) module 102 may provide a request management system normalized security list (RMS-NSL). For example, based on a supplied device type, request management system normalized security list (RMS-NSL) may be generated at the request management system (RMS) module 102. As discussed above, uniform standards for providing a normalized security list (NSL) may be applied based on the behavior of the device type. In one embodiment, for example, an illustrative request management system normalized security list (RMS-NSL) may be expressed in TABLE 1 below:

TABLE 1

| RMS-NSL |
|---|
| asmith |
|     ElementA PrivX Days |
|     ElementB PrivX Days |
|     ElementC PrivX Days |
| cjones |
|     ElementA PrivX Days |
|     ElementB PrivX Days |
|     ElementC PrivX Days |
| dsapp |
|     ElementA PrivX Days |
|     ElementB PrivX Days |
|     ElementC PrivX Days |
| fdill |
|     ElementB PrivX Days |
|     ElementC PrivX Days |

In this example, there may be four (4) sample UserIDs: asmith, cjones, dsapp, and fdill, where each UserID also includes elements with which it has access (e.g., "ElementA," Element B," "Element C," etc.), a particular privclass (e.g., "PrivX," etc.), and time of last login (e.g., how many "days" ago). Other various formats and/or embodiments may also be provided.

A network element (NE) may be any element/component within a network that may make the network function. These may include, but are not limited to, a switch, a light wave gear, a router, a cross-connect, etc. The network element (NE) module 106 may store and/or provide information (e.g., UserIDs) associated with users having access to the network/platform via a network element (NE). Thus, the network element (NE) module 106 may provide a network element normalized security list (NE-NSL) and/or other related information.

The network element (NE) module 106 may include a SQL Server, UNIX based servers, Windows 2000 Server, Microsoft IIS server, Apache HTTP server, API server, Java sever, Java Servlet API server, ASP server, PHP server, HTTP server, Mac OS X server, Oracle server, IP server, and/or other independent server to provide one or more request management system normalized security lists (RMS-NSLs). Also, the network element (NE) module 106 may store and/or run a variety of software, for example, Microsoft NET framework, etc. In some embodiments, the network element (NE) module 106 may apply various languages to generate a network element normalized security list (NE-NSL). For example, the network element (NE) module 106 may use Perl, Expectant TCL (Transaction Content Languages), COBOL, C/C+, Fortran, etc. Other various languages may also be provided.

The data and/or information provided by the network element (NE) module 106 may be stored and/or indexed in one or more databases (e.g., the network element (NE) storage 108). In this example, the network element (NE) module 106 may store data and/or information (e.g., UserIDs) associated with those users having access to the network/platform. In some embodiments, the data and/or information may be provided in one or more flat files. In other embodiments, the data and/or information may be stored based on emulation of a user logging into the network.

The network element (NE) module 106 may be in communication with the equalizer module 110. Here, the network element (NE) module 106 may utilize processor logic to provide the data and/or information, for example, in a normalized security list (e.g., a network element normalized security list (NE-NSL)) and deliver it to the equalizer module 110 for processing. In addition to providing a network element normalized security list (NE-NSL), the network element (NE) module 106 may also provide, record, store, and/or index other security-related data and/or information.

Although the network element (NE) module 106 is depicted as one module, it should be appreciated that the contents of the network element (NE) module 106 may be combined into fewer or greater numbers of modules, servers (or server-like devices), devices, and components and may be connected to one or more data storage systems, in addition to the network element (NE) storage 108. For example, in some embodiments, a builder (not shown) may be communicatively coupled to the network element (NE) module 106 to assist in generating the network element normalized security list (NE-NSL). Furthermore, the network element (NE) module 106 may be local, remote, or a combination thereof to the equalizer module 110, processing module 112, and/or output device 114. The network element (NE) module 106 may also store additional data and/or information relevant for personalized security functionalities.

As described above, the network element (NE) module 106 may provide a network element normalized security list (NE-NSL). For example, based on a supplied device type, network element normalized security list (NE-NSL) may be generated at the network element (NE) module 106. The network element normalized security list (NE-NSL) may be a set of data/information collected from network elements within a network. In some embodiments, the network element normalized security list (NE-NSL) may be built in layers from each raw audit data file (e.g., flat files). For example, a first NE audit data file may be used to produce a base for the list. For each subsequent network element (NE) audit file, the file may be opened to process additional records in the file. Each record received may contain a network element (NE) UserID and privclass data. The base normalized security list (NSL) may be searched for the network element (NE) UserID. In the event the network element (NE) UserID is found, an index marker may be retained for its location. In the event the network element (NE) UserID is not found, it may be inserted into the network element normalized security list (NE-NSL) in alphabetical order and the index marker may be set to a new location. Thus, at the current index marker location, the current network element (NE) element name privclass may be inserted into the element list. As discussed above, uniform standards (e.g., alphabetical order) for providing a normalized security list (NSL) may be applied based on the behavior of the device type.

In one embodiment, for example, an illustrative network element normalized security list (NE-NSL) may be expressed in TABLE 2 below:

TABLE 2

| NE-NSL |
|---|
| asmith |
|     ElementA PrivX Days |
|     ElementB PrivX Days |
|     ElementC PrivX Days |
| bgood |
|     ElementA PrivX Days |
|     ElementB PrivX Days |
| cjones |
|     ElementA PrivX Days |
|     ElementB PrivY Days |
|     ElementC PrivX Days |
| dsapp |
|     ElementA PrivX Days |
|     ElementC PrivX Days |
|     ElementD PrivX Days |
|     ElementE PrivX Days |

In this example, there may be four (4) sample UserIDs: asmith, cjones, dsapp, and fdill, where each UserID also includes elements with which it has access (e.g., "Element A," Element B," "Element C," etc.), a particular privclass (e.g., "PrivX," etc.), and time of last login (e.g., how many "days" ago). Other various formats and/or embodiments may also be provided.

The equalizer module 110 may be configured to receive at least the request management system normalized security list (RMS-NSL) from the request management system (RMS) module 102 and the network element normalized security list (NE-NSL) from the network element (NE) module 106. The equalizer module 110 may utilize processor logic to evaluate and equalize the data and/or information in the request management system normalized security list (RMS-NSL) and the network element normalized security list (NE-NSL). Accordingly, the equalizer module 110 may process and compare the request management system normalized security list (RMS-NSL) against the network element normalized security list (NE-NSL) and the network element normalized security list (NE-NSL) against the request management system normalized security list (RMS-NSL).

In some embodiments, for example, the request management system normalized security list (RMS-NSL) may represent the central system's database of record for a specific device type of the UserIDs, on what elements they exist, and/or their privclasses. The network element normalized security list (NE-NSL) may be a single composite list that represents the same type of data as the request management system normalized security list (RMS-NSL) with the source being the network elements rather than the request management system (RMS). Although the request management system normalized security list (RMS-NSL) and the network element normalized security list (NE-NSL) should be identical, these lists may become unsynchronized due to a number of various factors. Therefore, the process of auditing to report the differences in the two lists may be important for determining the appropriate corrective action.

In one embodiment, one way for processing/comparing the lists may include traversing each list and compare every item with the entire contents of the other list. However, with thousands of userIDs on thousands of network elements this may result in tens of thousands of list scans.

It should be appreciated that the request management system normalized security list (RMS-NSL) may be created in a single pass directly from the database. It should also be appreciated that the network element normalized security list (NE-NSL) may be constructed as the audit files are read. Accordingly, the network element normalized security list (NE-NSL) may not have needed to be sequentially scanned to add information. Since the list is alphabetical, a binary-search may be utilized.

Therefore, in order to reduce processing time and/or simplify audit processing, the request management system normalized security list (RMS-NSL) and the network element normalized security list (NE-NSL) may be equalized to contain the exact same number of items. The audit process may then become an item-by-item position based compare and report process with no full list scans required. As a result, TABLE 3A may show how two non-equalized lists may be depicted:

TABLE 3A

| RMS-NSL | NE-NSL |
|---|---|
| asmith | asmith |
|     ElementA PrivX Days |     ElementA PrivX Days |
|     ElementB PrivX Days |     ElementB PrivX Days |
|     ElementC PrivX Days |     ElementC PrivX Days |
| cjones | bgood |
|     ElementA PrivX Days |     ElementA PrivX Days |
|     ElementB PrivX Days |     ElementB PrivX Days |
|     ElementC PrivX Days | cjones |
| dsapp |     ElementA PrivX Days |
|     ElementA PrivX Days |     ElementB PrivY Days |
|     ElementB PrivX Days |     ElementC PrivX Days |
|     ElementC PrivX Days | dsapp |
| fdill |     ElementA PrivX Days |
|     ElementB PrivX Days |     ElementC PrivX Days |
|     ElementC PrivX Days |     ElementD PrivX Days |
|  |     ElementE PrivX Days |

It should be appreciated that the bolded text may indicate discrepancies between the two lists.

After the NSL equalization process, TABLE 3B may show how two equalized lists may be depicted:

TABLE 3B

| RMS-NSL | NE-NSL |
|---|---|
| asmith | asmith |
|     ElementA PrivX Days |     ElementA PrivX Days |
|     ElementB PrivX Days |     ElementB PrivX Days |
|     ElementC PrivX Days |     ElementC PrivX Days |
| + | bgood |
|     + |     ElementA PrivX Days |
|     + |     ElementB PrivX Days |
| cjones | cjones |
|     ElementA PrivX Days |     ElementA PrivX Days |
|     ElementB PrivX Days |     ElementB PrivY Days |
|     ElementC PrivX Days |     ElementC PrivX Days |
| dsapp | dsapp |
|     ElementA PrivX Days |     ElementA PrivX Days |
|     ElementB PrivX Days | + |
|     ElementC PrivX Days |     ElementC PrivX Days |
| + |     ElementD PrivX Days |
| + |     ElementE PrivX Days |
| fdill | + |
|     ElementB PrivX Days | + |
|     ElementC PrivX Days | + |

In this example, it should be appreciated that for any data that was not in the corresponding list, an entry may be created with an equalization fill code (EFC), e.g., a "+" or other similar EFC. Thus, for "asmith," both lists may have indicated identical "asmith" entries. Therefore, no action may have been taken with regards to "asmith." UserID "bgood," however, may not appear in the RMS-NSL but does appear in the NE-NSL. As a result, an entry may be created in RMS-NSL position 2 with corresponding EFCs. UserID "cjones" does have a discrepancy in that the privclass on ElementB does not match, but this does not affect the equalization process and will be left for the actual audit logic to report. The account for "dsapp" was not found on ElementB, so an EFC was inserted into position 4 in the NE-NSL element list. Additionally, "dsapp" was unexpectedly found on ElementD and ElementE so EFCs were added in position 4 and 5 in that element list. Finally, userID "fdill" does appear in the RMS-NSL but was not found on any network elements so EFCs were added in the NE-NSL in position 5

Although the equalizer module 110 is depicted as one module, it should be appreciated that the contents of the equalizer module 110 may be combined into fewer or greater numbers of modules, servers (or server-like devices), devices, and components and may be connected to one or more data storage systems. Furthermore, the equalizer module 110 may be local, remote, or a combination thereof to request management system (RMS) module 102, the network element (NE) 106, processing module 112, and/or output device 114. The equalizer module 110 may also store additional data and/or information relevant for personalized security functionalities.

The processing module 112 may be configured to receive at least the equalized request management system normalized security list (RMS-NSL) and the equalized network element normalized security list (NE-NSL) from the equalizer module 110. The processing module 112 may utilize processor logic to evaluate and process the data and/or information in the equalized request management system normalized security list (RMS-NSL) and the equalized network element normalized security list (NE-NSL). For example, the processing module 112 may perform auditing processing based on the equalized request management system normalized security list (RMS-NSL) and the equalized network element normalized security list (NE-NSL).

In some embodiments, for example, the processing module 112 may receive an audit request along with a content service provider (CSP) transaction number and/or device type. The processing module 112 may then request a request management system normalized security list (RMS-NSL) by supplying the request management system (RMS) module 102 (e.g., via an request management system (RMS) formatter) with the device type. The next step may be to launch audit transaction (e.g., using a Perl pre-processor) for the relevant device type. During this phase, each line of the raw audit data may be translated into a normalized security list (NSL) entry which is then given to the network element (NE) module (e.g., via a network element normalized security list (NE-NSL) builder). In this example, the builder may determine what additions are to be made in the main network element normalized security list (NE-NSL). This process may be repeated for every raw audit data file (e.g., an *.aud file). The result may be one overlaid network element normalized security list (NE-NSL) that contains all of the information from all of the audit files.

When both the request management system normalized security list (RMS-NSL) and the network element normalized security list (NE-NSL) have been completed, the equalizer module 110 may be called with both list handles. The equalizer module 110 may process both lists so that they are positionally aligned. Once that process is complete, the processing module 112 may then traverse the equalized list and report on discrepancies.

In one embodiment, the report on discrepancies may be outputted to the output device 114. The output device 114 may be any device capable of transmitting data, receiving data, and/or presenting data (e.g., via a web page or other similar presentation). In one embodiment, the output device may include a display device, such as a television, a monitor, an interactive television, a receiver, a tuner, a high definition (HD) television, a HD receiver, a video-on-demand (VOD) system. In another embodiment, the output device may be a communications device, such as a personal digital assistant (PDA), a mobile phone, a smart phone, a network appliance, an Internet browser, a pager, a mobile device, or a handheld device. In yet another embodiment, the output device may be a computer, such as a desktop computer, a laptop/notebook, a workstation, a printer, a thin system, a fat system, a remote controller, or other device, such as a multimedia device, an alert device, an audio device (e.g., MP3 player), a video game console, a video game controller, a digital photo frame, a global positioning system (GPS), personal video recorder (PVR) (e.g., a digital video recorder (DVR)), or other device capable of transmitting, receiving, and/or presenting signals.

Figure 2:
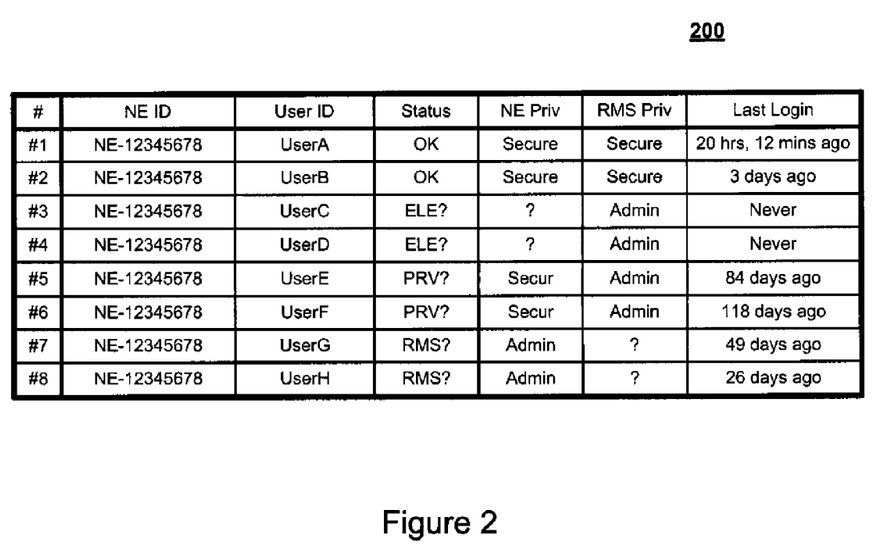
FIG. 2 depicts an illustrative screenshot of output results, according to an exemplary embodiment.

As discussed above, FIG. 2 depicts an illustrative screenshot of output results, according to an exemplary embodiment. In this example, the first two UserIDs shown—UserA and User B—may have no anomalies since the IDs appear on the network element with the proper privilege class. Thus, they status may be indicated as "OK." These examples are similar to "asmith," as described above. The next two users may be examples of IDs that the request management system (RMS) may have a record of management approval. In other words, these UserIDs—UserC and UserD—should be on the network element but may not be indicated as such. Thus, their status is indicated as "ELE?," which may represent "network element/device." These examples are similar to "fdill," as described above. For the next two—UserE and UserF, the IDs may be found on the network element (NE) and in the request management system (RMS) but there is a difference in their privilege class that must be researched and resolved. Thus, their status is indicated as "PRV?," which may represent "privclass." These examples are similar to "cjones" and "dsapp," as described above. The last two—UserG and UserH—may be found on the network element (NE), but no records for them may be found in the request management system (RMS). These examples are similar to "bgood," as described above. In application, in the even this had been an actual audit result the last two users (G and H) would have highest priority for resolution since these represent highest network security risk (unidentifiable users at a network element without the system having any record of their existence and/or access privilege).

It should be appreciated that the processing module 112 may be an audit processor that processes the results of the equalized normalized security lists (NSLs) from the equalizer module 110. It should be appreciated that the processing module 112 may highlight the results from the equalized NSLs and output them to an output device 114. In one embodiment, the processing module may output the results in a web page format.

By performing the various features and functions as discussed above, a normalized security list may be efficiently provided. Not only does this provide an effective and improved technique for providing a normalized security list, it may also comprehensively report issues and/or discrepancies associated with authentication and access control. Accordingly, exemplary embodiments may expand the limited number of techniques for improving overall network security.

Providing a normalized security list may have several advantages. For example, as discussed above, exemplary embodiments for providing a normalized security list may utilize shared memory. Shared memory may allow various parties and/or modules to concurrently perform various parts of the entire audit process. For example, network element data may be gathered while it is also being loaded into memory and/or being equalized at another site. Yet another module may be producing a report that shows the audit while all this is being performed. Thus, advantages of efficiency may be readily apparent with shared memory utilization.

Another advantage may be use of various and/or different languages. Each of the components of the system 100 may be configured to be compatible to support a variety of programming and/or processing languages/protocols. This may be particularly helpful for improving equalizing lists generated by different components of the system 100. By using multi-language/protocol-support, uniformity and standardization may be achieved. Ultimately, an improved and normalized security list may be generated/reported and network security issues may be more readily resolvable.

It should be appreciated that that embodiments for providing a normalized security list (NSL) may be dynamic, automatic, and/or manual. For example, the normalized security list (NSL) may be automatically used to resolve security issues at various components of the system 100. In another example, the normalized security list (NSL) may be useful for manual resolution and/or deployment of one or more security features/functionalities. Other various embodiments may also be provided.

It should be appreciated that each of the components of the system 100 may be configured to receive, transmit, and/or process signals/data. For example, each of servers, server-like systems, and/or modules of the system 100 may have one or more receivers, one or more transmitters, and/or one or more processors in order to communicate (e.g., receive, process, and/or transmit data/information) with the other components of system 100. Communications may be achieved via transmission of electric, electromagnetic, optical, or wireless signals and/or packets that carry digital data streams using a standard telecommunications protocol and/or a standard networking protocol. These may include, but not limited to, Session Initiation Protocol (SIP), Voice Over IP (VoIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols. Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or subscribers may also use standard wireless protocols including IEEE 802.11a, 802.11b, 802.11g, etc., or via protocols for a wired connection, such as an IEEE Ethernet 802.3

It should be appreciated that one or more data storage systems (e.g., databases) may also be coupled to each of the devices or servers of the system 100. In one embodiment, the one or more data storage systems may store relevant information for each of the servers and system components.

It should be appreciated that the contents of any of these one or more data storage systems may be combined into fewer or greater numbers of data storage systems and may be stored on one or more data storage systems and/or servers. Furthermore, the data storage systems may be local, remote, or a combination thereof. In other embodiments, information stored in the databases may be useful in providing additional customizations for improving efficiency in delivering a normalized security list (NSL).

Additionally, one or more processors (not shown) may also be coupled to each of the components (e.g., servers, modules, devices, storage etc.) of the system 100. It should be appreciated that the one or more processors may be used for at least processing, calculating, organizing, multiplexing, demultiplexing, remultiplexing, compressing, decompressing, formatting, and reformatting data and/or information. In another embodiment, for example, the one or more processors may be used for all logic processing, as described above, for efficient product delivery, network resource management, etc.

Figure 3:
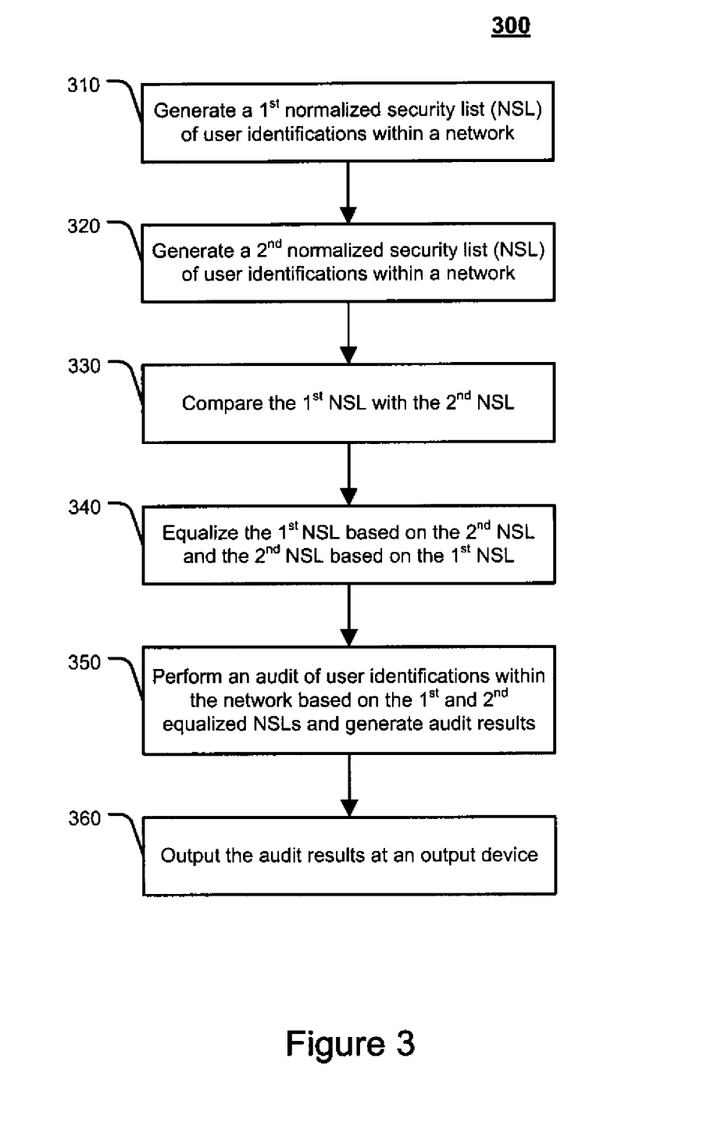
FIG. 3 depicts a flowchart of a method for providing a normalized security list at an equalizer module, according to an exemplary embodiment.

FIG. 3 depicts a flowchart of a method for providing a normalized security list 300, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by the system 100 shown in FIG. 1 by way of example, and various elements of the system 100 are referenced in explaining the example method of FIG. 3. Each block shown in FIG. 3 represents one or more processes, methods, or subroutines carried in the exemplary method 300. A computer readable media comprising code to perform the acts of the method 300 may also be provided. Referring to FIG. 3, the exemplary method 300 may begin at block 310.

At block 310, a first normalized security list may be generated. For example, the request management system (RMS) module 102 may be configured to generate a first normalized security list of user identifications within a network. It should be appreciated that the first normalized security list may be a request management system normalized security list (RMS-NSL) that lists user identifications based on data from the request management system (RMS) (e.g., stored in the request management system (RMS) storage 104).

At block 320, a second normalized security list may be generated. For example, the network element (NE) module 102 may be configured to generate a second normalized security list of user identifications within a network. It should be appreciated that the second normalized security list may be a network element (NE) normalized security list (NE-NSL) that lists user identifications based on data from the network element (NE) (e.g., stored in the request network element (NE) storage 108).

It should be appreciated that the first normalized security list and/or the second normalized security list may be generated at a predetermined interval (e.g., every week, day, hour, minute, etc.). In this example, the predetermined interval may be set according to network security requirements determined by, for example, an administrator. In other embodiments, the first normalized security list and/or the second normalized security list may be generated may be generated upon request by any component of the system 100. For example, the equalizer module 110 and/or the processing module 112 may send a request to the request management system (RMS) module 102 and/or the network element (NE) module 102 to request a normalized security list. It should also be appreciated that the first normalized security list and/or the second normalized security list may be generated on a request basis as well. Other various embodiments for list generation may also be provided.

At block 330, the first normalized security list and the second normalized list may be compared. For example, the equalizer module 110 may be configured to compare the first normalized security list with the second normalized security list. As described above, it should be appreciated that the equalizer module 110 may receive the first normalized security list and the second normalized list at a predetermined interval and/or upon request (e.g., by the equalizer module 110).

At block 340, the first normalized security list and the second normalized security list may be equalized. For example, the equalizer module 110 may be configured to equalize the first normalized security list based on the second normalized security list and equalize the second normalized security list based on the first security list. In some embodiments, equalizing comprises aligning entries of the first normalized security list with the second normalized security list. In one embodiment, aligning may include determining discrepancies between the first normalized security list and the second normalized security list. In another embodiment, aligning may also include inserting an equalization fill code in at least the first normalized security list and the second normalized security list to maintain alignment of the first normalized security list with the second normalized security list. It should be appreciated that the first normalized security list may be referred to as a first equalized normalized security list and the second normalized security list may be referred to as a second equalized normalized security list.

At block 350, an audit may be performed. For example, the processing module 112 may be configured to perform an audit of user identifications within the network by processing the first equalized normalized security list and the second equalized normalized security list and generating audit results based on the processing.

At block 360, audit results may be outputted. For example, the processing module 112 may further output the audit results to the output device 114. In some embodiments, the audit results may be output as a web page for display in the output device 114. It should be appreciated that the output device may include at least one of a television, a computer, a laptop, a phone, a personal digital assistant (PDA), a pager, a handheld device, a network appliance, an Internet browser, a global positioning system (GPS), and an electronic device capable of receiving signals. Other various embodiments may also be provided.

It should be appreciated that the request management system (RMS) module 102, the network element (NE) module 106, the equalizer module 110, and/or the processing module 112 may utilize a shared memory. In should also be appreciated that the request management system (RMS) module 102, the network element (NE) module 106, the equalizer module 110, and/or the processing module 112 may each be configured to operate in a multi-language/protocol format. As discussed above, utilizing a shared memory and operating in a multi-language/protocol format may improve efficiency and uniformity in processing. As a result, network security may be optimized.

Figure 4:
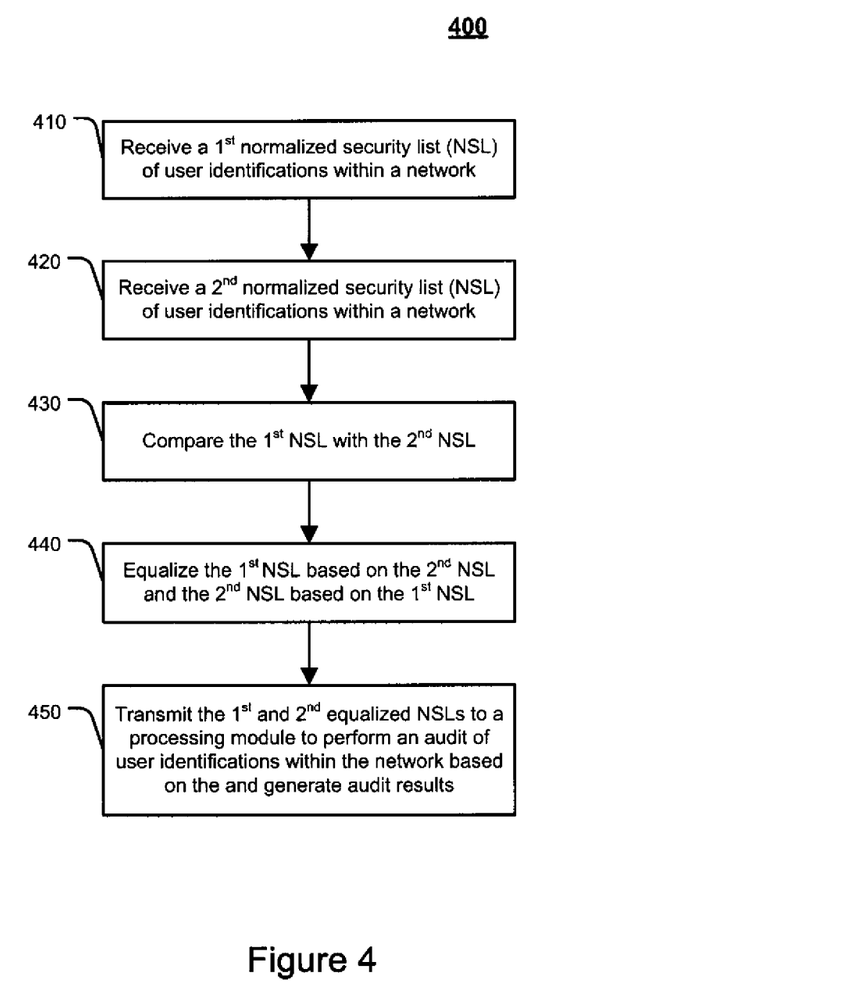
FIG. 4 depicts a flowchart of a method for providing a normalized security list at a processing module, according to another exemplary embodiment.

FIG. 4 depicts a flowchart of a method for providing a normalized security list 400, according to an exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by the system 100 shown in FIG. 1 by way of example, and various elements of the system 100 are referenced in explaining the example method of FIG. 4. Each block shown in FIG. 4 represents one or more processes, methods, or subroutines carried in the exemplary method 400. A computer readable media comprising code to perform the acts of the method 400 may also be provided. Referring to FIG. 4, the exemplary method 400 may begin at block 410.

At block 410, a first normalized security list may be received. For example, a receiver at the equalizer module 110 may be configured to receive from the request management system (RMS) module 102 a first normalized security list of user identifications within a network. It should be appreciated that the first normalized security list may be a request management system normalized security list (RMS-NSL) that lists user identifications based on data from the request management system (RMS) (e.g., stored in the request management system (RMS) storage 104).

At block 420, a second normalized security list may be received. For example, a receiver at the equalizer module 110 may be configured to receive from the network element (NE) module 102 a second normalized security list of user identifications within a network. It should be appreciated that the second normalized security list may be a network element (NE) normalized security list (NE-NSL) that lists user identifications based on data from the network element (NE) (e.g., stored in the request network element (NE) storage 108).

At block 430, the first normalized security list and the second normalized list may be compared. For example, one or more processors at the equalizer module 110 may be configured to compare the first normalized security list with the second normalized security list.

At block 440, the first normalized security list and the second normalized list may be equalized. For example, one or more processors at the equalizer module 110 may be configured to equalize the first normalized security list based on the second normalized security list and equalize the second normalized security list based on the first security list. In some embodiments, equalizing comprises aligning entries of the first normalized security list with the second normalized security list. In one embodiment, aligning may include determining discrepancies between the first normalized security list and the second normalized security list. In another embodiment, aligning may also include inserting an equalization fill code in at least the first normalized security list and the second normalized security list to maintain alignment of the first normalized security list with the second normalized security list.

At block 450, the first normalized security list and the second normalized list may be transmitted for processing. For example, a transmitter at the equalizer module 110 may be configured to transmit the first normalized security list and the second normalized list to the processing module 112 for performing an audit of user identifications within the network, where the first equalized normalized security list and the second equalized normalized security list may be processed and audit results based on the processing being generated.

It should be appreciated that the processing module 112 may further output the audit results to the output device 114. In some embodiments, the audit results may be output as a web page for display in the output device 114. It should be appreciated that the output device may include at least one of a television, a computer, a laptop, a phone, a personal digital assistant (PDA), a pager, a handheld device, a network appliance, an Internet browser, a global positioning system (GPS), and an electronic device capable of receiving signals. Other various embodiments may also be provided.

It should be appreciated that the request management system (RMS) module 102, the network element (NE) module 106, the equalizer module 110, and/or the processing module 112 may utilize a shared memory. In should also be appreciated that the request management system (RMS) module 102, the network element (NE) module 106, the equalizer module 110, and/or the processing module 112 may each be configured to operate in a multi-language/protocol format. As discussed above, utilizing a shared memory and operating in a multi-language/protocol format may improve efficiency and uniformity in processing. As a result, network security may be optimized.

Embodiments of providing a normalized security list may expand the limited number of techniques for ensuring security in networks. By utilizing stored memory and multi-language support functionalities, a normalized security list may be efficiently and comprehensively provided to identify potential security threats.

While the features and functionalities of the providing normalized security lists in the context of networks and user access and privileges, it should be appreciated that the features and functionalities of one embodiment may be similarly applied to other embodiments. For example, these may include marketing, advertisements, and/or any field where one or more lists may be compared and/or equalized to optimize overall performance. Thus, exemplary embodiments may apply similarly to a host of other network and non-network issues as well, where applicable.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A computer-implemented method, comprising:
generating, by one or more processing devices, a first normalized security list of first user identifications, wherein the first user identifications identify users within a network;
generating, by one or more processing devices, a second normalized security list of second user identifications, wherein the second user identifications identify users within the network and further wherein one or more of the second user identifications identify the same users as one or more of the first user identifications;
comparing, by one or more processing devices, the first normalized security list with the second normalized security list;
equalizing, by one or more processing devices, the first normalized security list based on the second normalized security list and equalizing the second normalized security list based on the first security list, the equalizing comprising:
aligning entries of the first normalized security list with the second normalized security list, such that aligning comprises:
determining discrepancies between entries and missing corresponding entries in the first normalized security list and the second normalized security list; and
inserting an equalization fill code in at least the first normalized security list and the second normalized security list, as required, wherein inserting the equalization fill code is performed to maintain alignment between the entries and the equalization fill code associated with the missing corresponding entries of the first normalized security list and the second normalized security list and to maintain discrepancies between data of the entries and data of the equalization fill code associated with the missing corresponding entries for the first normalized security list and the second normalized security list;

performing, by one or more processing devices, an audit of user identifications within the network by processing the first equalized normalized security list and the second equalized normalized security list and generating audit results based on the processing, wherein the audited user identifications comprise the first user identifications and the second user identifications; outputting the audit results to an output device, as a web page, wherein the output audit results comprise for each of the audited user identifications: a network element (NE) identification, a status, a NE privilege, a request management system (RMS) privilege, and a last login; and performing a comparison between the NE privilege and the RMS privilege to determine issues and/or discrepancies in access control for one or more of the audited user identifications associated with the output results.

2. The computer-implemented method of claim 1, wherein inserting an equalization fill code comprises creating one or more new entries in the normalized security list associated with the missing corresponding entries, and further wherein each of the one or more new entries are filled with the equalization fill code.

3. The computer-implemented method of claim 1, wherein at least one of the one or more processing devices is an RMS processor such that the first normalized security list lists user identifications based on data from the RMS processor.

4. The computer-implemented method of claim 1, wherein at least one of the one or more processing devices is a NE processor such that the second normalized security list lists user identifications based on data from the NE processor that is coupled to at least one of a switch, a router, or a cross-connect.

5. The computer-implemented method of claim 1, wherein the one or more processing devices utilize a shared memory.

6. The computer-implemented method of claim 1, wherein the one or more processing devices operate in a multi-language format.

7. The computer-implemented method of claim 1, wherein inserting the equalization fill code to maintain discrepancies comprises the data of at least one entry in the first normalized security list not matching the data of at least one entry in the second normalized security list in order to be recognized as a discrepancy during the audit.

8. A non-transitory computer readable media comprising code to perform the method of claim 1.

9. A computer-based system, comprising:
one or more processing devices configured to:
generate a first normalized security list of first user identifications, wherein the first user identifications identify users within a network;
generate a second normalized security list of second user identifications, wherein the second user identifications identify users within the network and further wherein one or more of the second user identifications identify the same users as one or more of the first user identifications;
compare the first normalized security list with the second normalized security list,
equalize the first normalized security list based on the second normalized security list, and
equalize the second normalized security list based on the first security list, wherein during the equalizing the one or more processing devices are further configured to:
align entries of the first normalized security list with the second normalized security list, such that aligning comprises:
determining discrepancies between entries and missing corresponding entries in the first normalized security list and the second normalized security list; and
inserting an equalization fill code in at least the first normalized security list and the second normalized security list, as required, wherein inserting the equalization fill code is performed in a manner to maintain alignment between the entries and the equalization fill code associated with the missing corresponding entries of the first normalized security list and the second normalized security list and to maintain discrepancies between data of the entries and data of the equalization fill code associated with the missing corresponding entries for the first normalized security list and the second normalized security list;
audit user identifications within the network by processing the first equalized normalized security list and the second equalized normalized security list and generating audit results based on the processing, wherein the audited user identifications comprise the first user identifications and the second user identifications;
output the audit results to an output device, as a web page, wherein the output audit results comprise for each of the audited user identifications: a network element (NE) identification, a status, a NE privilege, a request management system (RMS) privilege, and a last login; and
perform a comparison between the NE privilege and the RMS privilege to determine issues and/or discrepancies in access control for one or more of the audited user identifications associated with the output results.

10. A computer-implemented method, comprising:
receiving, by one or more processing devices, a first normalized security list of first user identifications, wherein the first user identifications identify users within a network;
receiving, by one or more processing devices, a second normalized security list of second user identifications, wherein the second user identifications identify users within the network and further wherein one or more of the second user identifications identify the same users as one or more of the first user identifications;
comparing, by one or more processing devices, the first normalized security list with the second normalized security list;
equalizing, by one or more processing devices, the first normalized security list based on the second normalized security list and equalizing the second normalized security list based on the first security list, the equalizing comprising:
aligning entries of the first normalized security list with the second normalized security list, such that aligning comprises:
determining discrepancies between entries and missing corresponding entries in the first normalized security list and the second normalized security list; and
inserting an equalization fill code in at least the first normalized security list and the second normalized security list, as required, wherein inserting the equalization fill code is performed in a manner to maintain alignment between the entries and the equalization fill code associated with the missing corresponding entries of the first normalized security list and the second normalized security list and to maintain discrepancies between data of the entries and data of the equalization fill code associated with the missing corresponding entries for the first normalized security list and the second normalized security list;

transmitting, by one or more processing devices, the first equalized normalized security list and the second equalized normalized security list to one or more processors to perform an audit of user identifications within the network and generate audit results based on the audit, wherein the audited user identifications comprise the first user identifications and the second user identifications;

outputting the audit results to an output device, as a web page, wherein the output audit results comprise for each of the audited user identifications: a network element (NE) identification, a user identification, a status, a NE privilege, a request management system (RMS) privilege, and a last login; and performing a comparison between the NE privilege RMS privilege to determine mine issues and/or discrepancies in access control for one or more of the audited user identifications associated with the output results.

11. The computer-implemented method of claim 10, wherein the output device comprises at least one of a television, a computer, a laptop, a phone, a personal digital assistant (PDA), a pager, a handheld device, a network appliance, an Internet browser, a global positioning system (GPS), or an electronic device capable of receiving signals.

12. The computer-implemented method of claim 10, wherein inserting an equalization fill code comprises creating one or more new entries in the normalized security list associated with the missing corresponding entries, and further wherein each of the one or more new entries are filled with the equalization fill code.

13. The computer-implemented method of claim 10, wherein at least one of the one or more processing devices is an RMS processor such that the first normalized security list lists user identifications based on data from the RMS processor.

14. The computer-implemented method of claim 10, wherein at least one of the one or more processing devices is a NE processor such that the second normalized security list lists user identifications based on data from the NE processor, wherein the NE processor is coupled to at least one of a switch, a router, or a cross-connect.

15. The computer-implemented method of claim 10, wherein inserting the equalization fill code to maintain discrepancies comprises the data of at least one entry in the first normalized security list not matching the data of at least one entry in the second normalized security list in order to be recognized as a discrepancy during the audit.

16. A non-transitory computer readable media comprising code to perform the method of claim 10.

17. A computer-implemented system, comprising:
one or more processing devices configured to:
receive from a first module, a first normalized security list of first user identifications, wherein the first user identifications identify users within a network, and receives, from a second module, a second normalized security list of second user identifications, wherein the second user identifications identify users within the network and further wherein one or more of the second user identifications identify the same users as one or more of the first user identifications;

compare the first normalized security list with the second normalized security list, equalize the first normalized security list based on the second normalized security list, and equalize the second normalized security list based on the first security list, wherein during the equalizing the one or more processing devices are further configured to:

align entries of the first normalized security list with the second normalized security list, such that aligning comprises:
determining discrepancies between entries and missing corresponding entries in the first normalized security list and the second normalized security list; and
inserting an equalization fill code in at least the first normalized security list and the second normalized security list, as required, wherein inserting the equalization fill code is performed in a manner to maintain alignment between the entries and the equalization fill code associated with the missing corresponding entries of the first normalized security list and the second normalized security list and to maintain discrepancies between data of the entries and data of the equalization fill code associated with the missing corresponding entries for the first normalized security list and the second normalized security list; and transmit the first equalized normalized security list and the second equalized normalized security list to one or more processors to perform an audit of user identifications within the network and generate audit results based on the audit, wherein the audited user identifications comprise the first user identifications and the second user identifications;

output the audit results to an output device, as a web page, wherein the output audit results comprise for each of the audited user identifications: a network element (NE) identification, a status, a NE privilege, a request management system (RMS) privilege, and a last login; and perform a comparison between the NE privilege and the RMS privilege to determine issues and/or discrepancies in access control for one or more of the audited user identifications associated with the output results.

* * * * *